March 25, 1958
C. G. GOETZEL ET AL
2,828,225
METHODS OF INFILTRATING HIGH MELTING SKELETON BODIES
Filed March 1, 1954
3 Sheets-Sheet 1
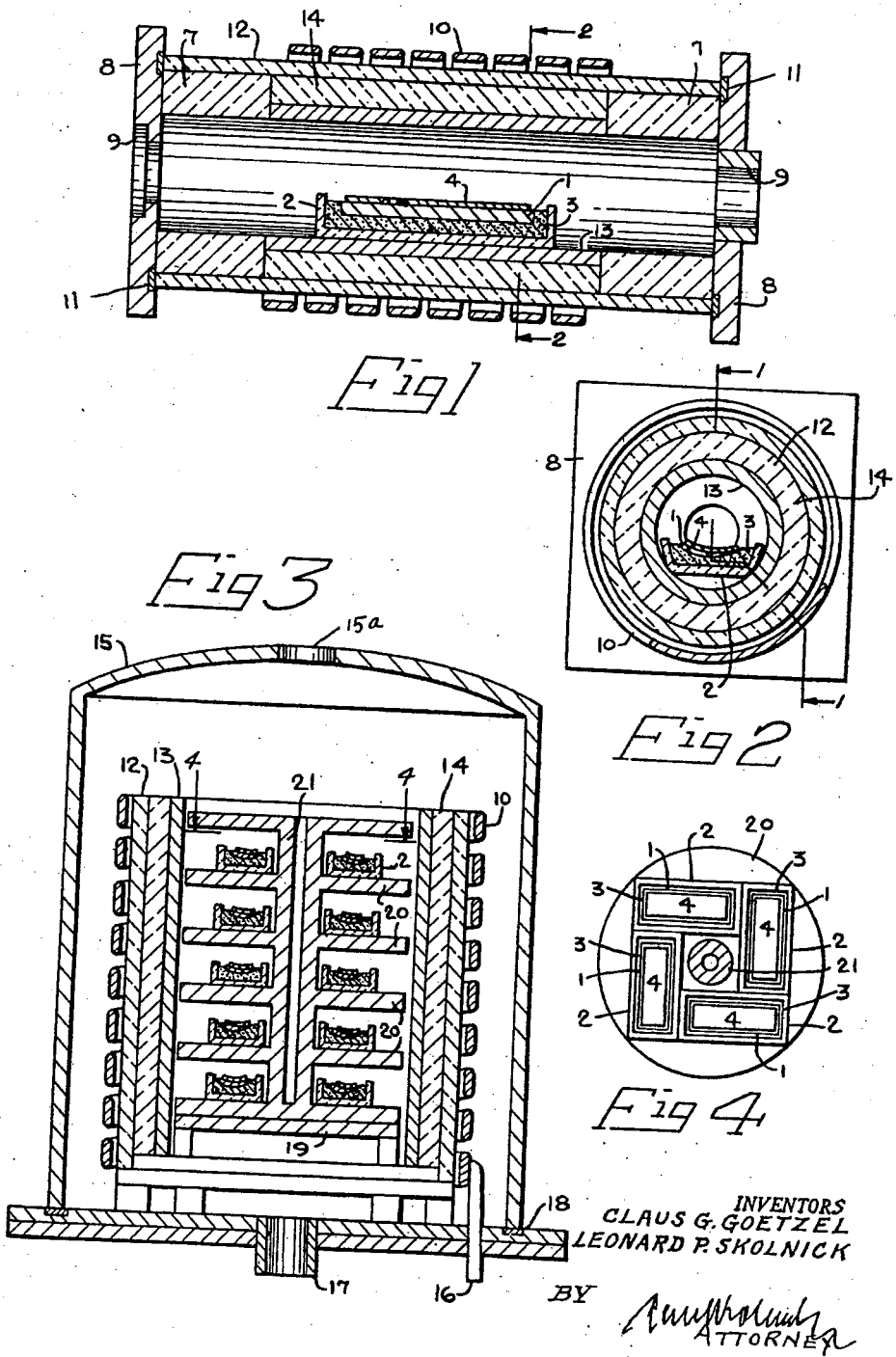
INVENTORS
CLAUS G. GOETZEL
LEONARD P. SKOLNICK
BY
ATTORNEY

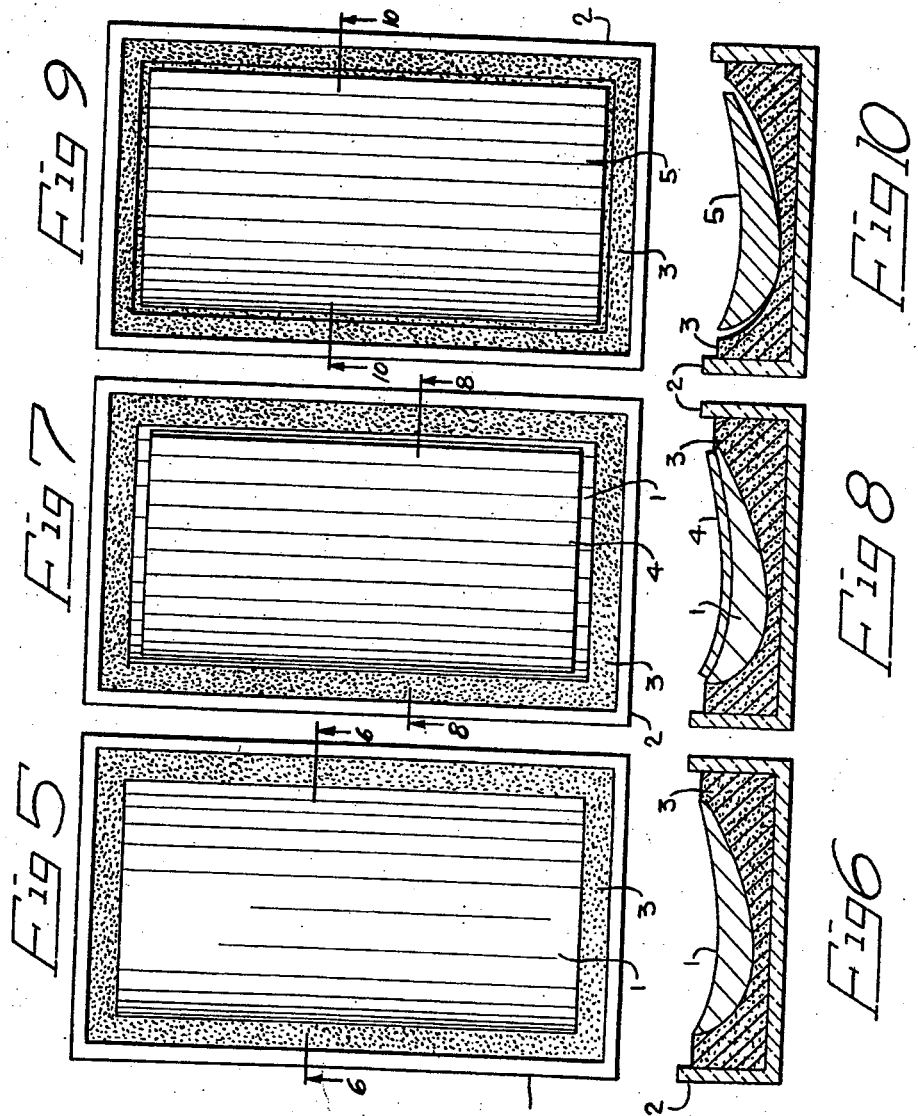

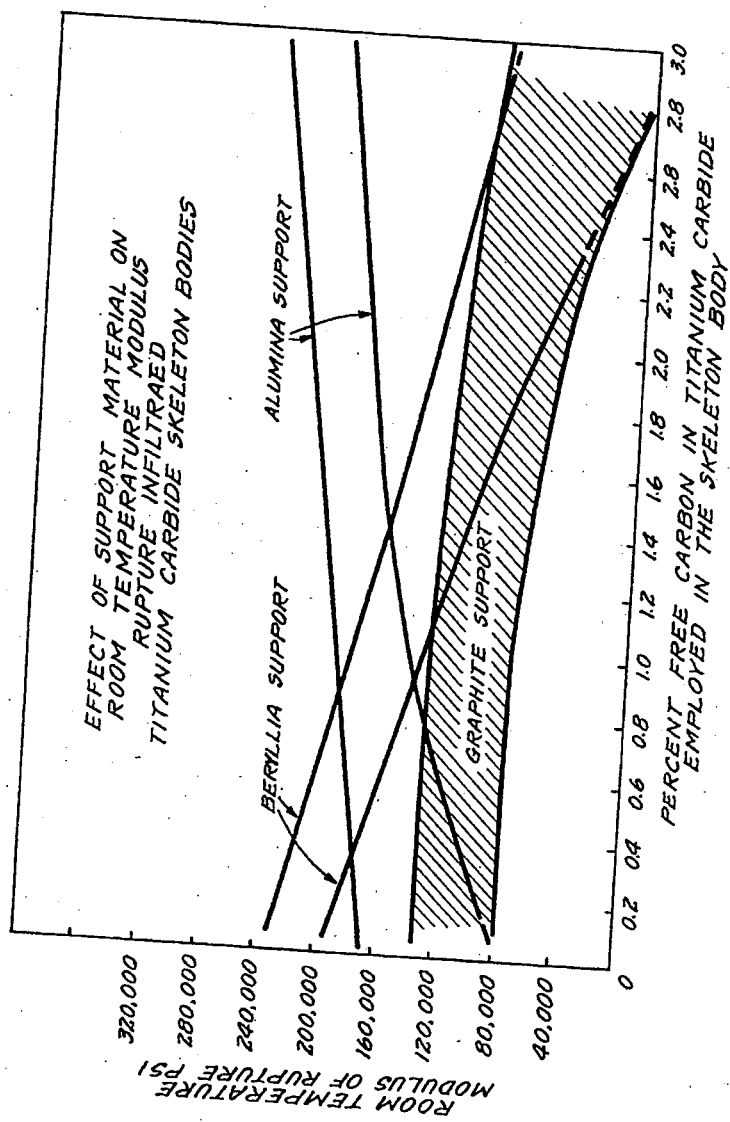

United States Patent Office 2,828,225
Patented Mar. 25, 1958

2,828,225

METHODS OF INFILTRATING HIGH MELTING SKELETON BODIES

Claus Guenter Goetzel, Yonkers, and Leonard Philip Skolnick, New York, N. Y., assignors to Sintercast Corporation of America, Yonkers, N. Y., a corporation of New York Application March 1, 1954, Serial No. 413,258

11 Claims. (Cl. 117—119)

The present invention relates to a method for infiltrating high melting skeleton bodies made from refractory metal carbide powder and more particularly to the infiltration of titanium carbide skeleton bodies. Examples of infiltrated bodies contemplated by the invention include thermal elements for jet engines and the like, tools and wear resisting parts including in general articles subjected to stress at high temperatures and/or to corrosion, erosion, abrasion, etc.

It is known to infiltrate porous skeleton bodies comprising high melting refractory materials, such as the infiltration of porous bodies of refractory metals, refractory metal alloys, or their compounds, for example tungsten carbide, titanium carbide, etc., by contacting porous bodies with an infiltrant or matrix-forming metal in the liquid state at an elevated temperature under controlled conditions. The infiltrant material has a lower melting point than the skeleton body and is drawn into the skeleton body by the well-known principle of capillary action. The infiltration may be achieved by placing the skeleton body into a ceramic vessel or boat and then applying the molten infiltrant or matrix-forming metal to one or more exposed portions of the skeleton body. Depending upon the nature of the surface chemistry of the materials involved, the molten infiltrant will generally wet the skeleton body at the contact areas and penetrate the pores until the porous skeleton body is substantially infiltrated. If the infiltrant metal is positioned above the skeleton body and in contact with it during infiltration the force of gravity supplements the capillary forces, whereas if the infiltrant metal is positioned below the skeleton body, the force of gravity counteracts the capillary forces. The aforementioned methods have been found satisfactory when employed in the production of electrical contacts by the infiltration of porous tungsten skeletons with such matrix-forming metals as copper or silver. However, when these same methods were employed in the production of refractory metal carbide bodies infiltrated with high melting matrix-forming metals, e. g. nickel, cobalt, etc., or heat resistant alloys based on one or more of these metals, the results were not always satisfactory and in many instances the infiltrated articles had poor physical properties.

The problems involved in the production of infiltrated articles from refractory carbides, such as titanium carbide, were considerably compounded by the high temperatures employed in their production in that the high temperatures tended to promote detrimental side reactions between the molten infiltrant metal, the refractory carbide skeleton and the supporting materials of the environment in contact therewith. It is well known that the general technique is to employ graphite as a contact support in the production of sintered (i. e., cemented) refractory carbide bodies such as tungsten carbide bodies, titanium carbide bodies and bodies made from other refractory carbide materials and/or mixtures thereof. However, in the production of infiltrated refractory carbide bodies, in particular titanium carbide, and even in the production of certain grades of cemented carbides, graphite was not found to be too satisfactory as a supporting material and generally was harmful in that it tended to affect adversely the properties of the finally produced product. This was found true particularly in systems involving infiltration or sintering in the presence of a liquid phase containing metals which tend, by reaction with graphite or other forms of carbon, to form simple and complex carbides which generally embrittled or otherwise harmfully affected the matrix. Attempts were made to replace graphite with more stable materials, for example refractory oxide supports, but in many instances the refractory oxides were likewise not too satisfactory due to detrimental side reactions in which gases would be evolved leading to physical disruption of the skeleton, porosity, etc. In addition, the final product would have poor properties due to the porosity and the formation of brittle phases during the side reactions. In producing infiltrated titanium carbide bodies, the problem was particularly acute, especially in the case of titanium carbide bodies produced from titanium carbide powder containing substantial amounts of free carbon. The presence of free carbon appeared to have an adverse effect on most refractory oxides and other high temperature materials employed as skeleton supporting materials during infiltration.

In controlling and confining the infiltration within the porous skeleton body, it was found necessary in many instances to surround substantially completely the skeleton body with a bedding support of refractory material leaving exposed a part of the skeleton upon which the infiltrant metal was placed. As the infiltrant metal melted, it penetrated the porous body and was substantially confined therein by the layer of refractory material supporting and surrounding said body. The aforementioned method is described in copending U. S. patent application Serial No. 292,498, filed on June 9, 1952, now Patent No. 2,798,809. In the parent application it was pointed out that when the titanium carbide powder employed in producing infiltrated bodies contained from about 1% to about 3% free carbon, it was difficult to obtain infiltrated bodies of satisfactory strength as the titanium carbide skeleton and the infiltrant metal tended to react adversely with such skeleton supporting bedding materials as zirconium oxide, magnesium oxide, thorium oxide, silicon carbide, etc., which led to unsatisfactory infiltration due to the detrimental formation of surface incrustations, surface porosity, surface adhesions, etc. The problem was further aggravated by the high infiltration temperatures employed which were in the neighborhood of 1400° C. or 1500° C. and higher. Bodies produced under the foregoing adverse conditions usually were non-uniform and had unsatisfactory strength properties. As pointed out in the aforementioned copending case (U. S. Ser. No. 292,498) the problems encountered were greatly minimized by employing a bedding material of aluminum oxide, particularly substantially chemically pure aluminum oxide, which enabled the satisfactory infiltration of skeleton bodies made from titanium carbide powder containing free carbon in amounts ranging from about 1% to about 3%.

Additional work since the aforementioned development has shown that the composition of titanium carbide is particularly critical with regard to the type of skeleton-supporting material employed in producing satisfactory infiltrated products. Thus, it was found that while aluminum oxide was an exceptionally good skeleton supporting material in producing infiltrated titanium carbide articles from titanium carbide containing from about 1% to about 3% free carbon, this material was not too adequate when the titanium carbide powder differed slightly in composition and had a lower free carbon content, for example below about 0.5% and as low as about 0.2% or even about 0.1%. Generally, when the titanium carbide powder contained less than about 1% free carbon, there was a marked tendency for the infiltrated article to adhere, weld and stick to the aluminum oxide or become eroded which required subjecting the infiltrated article to considerable cleaning or finishing by grinding and by other mechanical operations. Even then the cleaned articles were not always uniform and did not always have the desired strength properties or soundness, especially adjacent the adhering surfaces.

It has now been discovered that porous titanium carbide skeletons produced from titanium carbide powder containing lower amounts of free carbon can be successfully infiltrated by employing another special refractory oxide skeleton-supporting material which does not substantially adversely affect the resulting infiltrated product.

It is an object of the invention to provide a method whereby titanium carbide powder containing at least about 0.1% free carbon can be utilized in forming skeleton bodies capable of being infiltrated at elevated temperatures to form bodies requiring a minimum of finishing operations.

Other objects and advantages will become apparent from the following description taken in conjunction with the accompanying drawing in which:

Fig. 1 is a vertical sectional view along line 1—1 of Fig. 2 of a high frequency heated vacuum furnace to be used for the infiltration of a turbine blade skeleton in accordance with the invention;

Fig. 2 is a vertical sectional view on line 2—2 of Fig. 1;

Fig. 3 is a vertical sectional view of a high frequency vacuum furnace for the infiltration of a plurality of turbine blade skeletons;

Fig. 4 is a top view on line 4—4 of Fig. 3;

Fig. 5 is a top view of a turbine blade skeleton supported by a refractory oxide pack;

Fig. 6 is a vertical cross-section taken along line 6—6 of Fig. 5;

Fig. 7 is a top view of the turbine blade skeleton with the infiltrant metal applied thereto;

Fig. 8 is a vertical cross-section along line 8—8 of Fig. 7;

Fig. 9 is a top view of the finished infiltrated blade;

Fig. 10 is a cross-section along line 10—10 of Fig. 9;

Fig. 11 depicts three bands of curves showing the comparative effects of various amounts of free carbon of titanium carbide on the modulus of rupture of infiltrated bodies produced therefrom while supported by or in separate contact with three different types of supports including a support provided by the invention.

Generally speaking, the present invention contemplates a method for producing heat resistant articles by the infiltration at elevated temperatures above 1100° C. and preferably above 1300° C. of a porous skeleton body produced from titanium carbide powder having a free carbon content of at least about 0.1% wherein a refractory bedding or support material comprising a substantially stable beryllia-base material is employed to support the skeleton during infiltration. It has been discovered that when the aforementioned type of skeleton-supporting material is employed, infiltrated titanium base carbide bodies of unexpectedly improved physical properties can be obtained by employing titanium carbide powder containing free carbon in lower amounts than was heretofore usable with alumina supports. In addition the infiltrated bodies are characterized by improved surface cleanliness, good shape retention and are not prone to stick to or react substantially detrimentally with the skeleton-supporting, beryllia-base, refractory material. The skeleton-supporting material has been found particularly satisfactory in the production of infiltrated titanium carbide bodies wherein the titanium carbide powder employed in making the body contains at least about 0.1% free carbon and ranges up to about 1%.

In carrying the invention into practice, it is preferred that a beryllia-base refractory material comprising substantially chemically pure beryllium oxide powder be employed as the skeleton-supporting material. One grade of beryllia which has given good results is a chemically pure grade having a beryllium oxide (BeO) content of at least about 99.5% with the balance incidental impurities such as iron oxide, aluminum oxide, lead oxide, etc. A chemically pure grade of beryllia which has given particularly good results is one containing about 99.8% of beryllium oxide. Generally, satisfactory results are obtained when the skeleton-supporting beryllia-base material has a beryllium oxide content of at least about 85%. Thus, the beryllia-base material may contain other refractory materials, for example, up to about 10% calcium oxide, up to about 10% aluminum oxide, up to about 10% magnesium oxide, up to about 10% thorium oxide, up to about 10% zirconium oxide, up to about 5% silicon carbide, up to about 2.5% silica, up to about 2.5% boron carbide, etc., the total amounts of the other refractory materials not exceeding about 15% of the beryllia-base material. It is, however, preferred that the beryllium oxide content be in excess of about 97.5% and thus be considered as substantially chemically pure for the purposes of the invention.

The beryllia-base, skeleton-supporting material may be employed either as a loosely bedded powder, as a coating on a refractory support, in a compacted and sintered form, or a hot pressed or slip cast form. In hot pressing flat support plates of beryllia, beryllium oxide powder having a theoretical density of about 3.016 grams per cubic centimeter is pressed in a graphite mold to a volume corresponding to an apparent density of at least about one gram per cubic centimeter at a pressure of at least 0.5 t. s. i. (tons per square inch) at a temperature of about 1500° C. to 2000° C., for example, by pressing at about 2 t. s. i. to about 2.3 grams per cubic centimeter at about 1700° C. for about 10 minutes. The pressed beryllia plate is cooled in air and then removed from the mold and fired in air at about 1000° C. to remove the carbon adhering to it from the mold walls. Beryllia plates produced in the manner given in the aforementioned example are quite tough and can be dropped onto a cement floor without substantially fracturing or being otherwise destroyed. Such plates have been found very satisfactory as skeleton-supporting material in producing a ring-shaped, wear resisting part by the infiltration of a porous ring blank produced from titanium carbide powder containing at least about 0.1% free carbon.

As has been stated hereinbefore, the present invention is particularly applicable to the utilization of titanium carbide powder containing free carbon ranging from about 0.1% to about 1% in the production of infiltrated bodies having improved strength properties at elevated temperatures. In producing such bodies, a titanium-base carbide powder may be employed containing by weight up to 20% tungsten carbide, up to 10% chromium carbide, up to 10% tantalum carbide and up to 10% columbium carbide and/or a combination thereof. By titanium-base carbide is meant a carbide comprising substantially titanium carbide and includes titanium carbide per se. Generally, the titanium carbide powder contains at least about 74% titanium and a total carbon content of at least 17%, the free carbon content being at least about 0.1%. The balance of the titanium carbide powder may comprise one or more of the elements iron, zirconium, aluminum, silicon, chromium, manganese, magnesium, molybdenum, tungsten, columbium, tantalum, calcium, vanadium, copper, barium, strontium, sodium, as well as hydrogen, oxygen and nitrogen, etc., in amounts which do not adversely affect the use of the powder in the process.

The titanium carbide skeleton employed in the infiltration process may be produced either by cold pressing followed by sintering or directly by hot pressing titanium carbide powder mixed with about 5% to 20% by weight of at least one binder metal selected from the group consisting of nickel, cobalt, and iron. Generally, the porous skeleton body will have a pore volume ranging from about 20% to 60% voids, with the volume occupied by the skeleton being about 80% to 40%. Preferably, the pore volume should range from about 25% to 55% (75% to 45% by volume for the skeleton), the most satisfactory being of the order of about 35% to 40% by volume (65% to 60% by volume for the skeleton). In producing the skeleton by cold pressing, a given amount of titanium carbide powder and the binder metal mixed therewith is cold pressed to a pre-determined volume sufficient to produce a skeleton having a pore volume of about 40% when the cold pressed skeleton body is sintered at sub-atmospheric pressure, usually in a vacuum at an elevated temperature, e. g., at about 1400° C.

The sintered porous skeleton is then placed upon a prepared flat beryllia-base support, preferably substantially chemically pure beryllia of at least 97.5% BeO content, and an infiltrant metal alloy placed on top of the skeleton. The assembly is then heated in a carbon tube vacuum induction furnace to an elevated temperature, for instance 1400° C., for a time suitable to effect complete infiltration, the vacuum being maintained at less than 500 microns of mercury column. It is desirable that the infiltration temperature be up to about 250° C. above the liquidus temperature of the infiltrant metal. When the infiltrated body is cooled and removed from the furnace it has a bright metallic surface, relatively sharp edges and exhibits practically no adherence or sticking to the beryllia-base support. Normally, when other supporting materials are employed, the skeleton does not absorb the infiltrant easily; it tends to lose its shape and also tends to spread over and adhere to the support made of other materials.

It is essential that the infiltration be carried out in a controlled, non-oxidizing atmosphere of sub-atmospheric pressure, i. e., in a technical vacuum of less than 500 microns down to about 5 microns or lower of mercury column in order to maintain the porous skeleton substantially free from gas inclusions which interfere with infiltration. The skeleton body prior to infiltration may be sintered in a reducing atmosphere of sub-atmospheric pressure of about 300 microns down to 5 microns of mercury column, preferably at a temperature of at least that of the temperature subsequently employed during the infiltration and possibly as high as 300° C. above it.

When employing beryllia powder as a skeleton-supporting bed, it is packed gently around the skeleton in the space between the walls of a refractory vessel or boat and the skeleton body leaving exposed a portion of the skeleton for absorbing the infiltrant metal. The powder bed employed in this manner helps to confine the infiltrant metal within the skeleton body, whereby a substantially clean infiltrated body of unexpected improved properties is obtained. When handling the powder in the loose form, precautions must be taken in view of its toxicity. It is preferred that such handling operations be carried out under a suitable suction hood.

A compacted beryllia powder bed is particularly applicable to the production of turbine blades for aircraft engines. In producing a turbine blade in accordance with the invention, a horizontal high frequency vacuum furnace may be used for the infiltration step as shown by Figs. 1 and 2 which illustrate how a turbine blade 1 would be infiltrated. The furnace comprises essentially a quartz tube 12 closed at both ends by cover plates 8 provided with center openings 9, one for the installation of a temperature sight window and the other one to serve as a connection to a vacuum pump. The furnace is provided with a high frequency coil 10, two vacuum seals 11, two ceramic spacer tubes 7, an inner graphite tube 13, and an insulation 14 therebetween.

A ceramic vessel 2 is located in the furnace to house the blade skeleton 1 to be infiltrated. A beryllium oxide bed 3 is provided in the space between vessel 2 and the turbine blade skeleton 1. A strip of infiltrating metal 4 is located on top of the skeleton. As is apparent from Fig. 2, vessel 2 rests with both of its sides contacting the graphite tube 13.

Figs. 3 and 4 illustrate a vertical vacuum furnace suitable for infiltration of a group of blades. The furnace consists of a water-cooled vacuum tight metal bell 15 provided with a temperature sight window 15a, an outer quartz tube 12, an inner graphite tube 13, and an insulation 14 therebetween. An induction coil 10 provided with current connections 16 surrounds the furnace. A tube 17 in the bottom of the furnace leads to a vacuum pump. The bell 15 is vacuum sealed at 18. A graphite structure consisting of a bottom 19, tiers 20, and center tube 21 supports the ceramic vessels 2 in which the turbine blade skeletons 1 are infiltrated by molten metal from metal strips 4. As in the previously described embodiment, a beryllium oxide bed 3 is located in the space between the skeletons 1 and vessels 2. The relative location of the infiltration vessels on the tiers 20 is apparent from Fig. 4.

Figs. 5 to 10 illustrate the arrangement of the infiltration vessels 2. The skeleton body 1 of a turbine blade comprising a free-carbon containing grade of titanium carbide is positioned in vessel 2 and a pack support or bedding 3 of substantially chemically pure beryllium oxide is formed in the space between the skeleton body and the inner walls of vessel 2. Figs. 7 and 8 correspond to Figs. 5 and 6 with the exception that a strip 4 of the infiltrant metal is placed on top of the blade, i. e. on surface portion thereof out of contact with bedding 3.

Figs. 9 and 10 illustrate the turbine blade 5 after completion of infiltration. The finished blade will have a smooth surface substantially free from erosions and defects and also will have relatively sharp edges, will be generally uniformly impregnated and will retain its intended shape.

The turbine blades are infiltrated while a technical vacuum of about 500 microns down to about 5 microns or less of mercury column is maintained in the furnace at about 1500° C. The infiltrant metal may comprise a heat resistant nickel-base alloy. While the foregoing method has been described for the production of turbine blades, it will be understood that the method is applicable to the production of other articles such as tools, wear resisting articles and articles subjected in use to corrosion, erosion, etc.

Generally, the infiltrant metal comprises a heat resistant metal from the group consisting of nickel and cobalt, their alloys with each other and heat resistant alloys containing one or more of these metals as major alloying ingredients, and having melting points above 1100° C., and preferably above 1300° C. By heat resistant alloys are meant those alloys based on either nickel and/or cobalt which also contain elements known to impart thereto heat resisting properties, such as chromium, tungsten and molybdenum, etc., either singly or in combination, with or without other elements employed as strengtheners, such as titanium, zirconium, aluminum, etc. Examples of heat resistant alloys which have been found satisfactory are those alloys known in the trade as Inconel, Nichrome V, Hastelloy–C, Stellite–31, Stellite–36, Stellite–6, etc.

Experimental evidence indicates that good results are obtained when substantially chemically pure beryllia powder (i. e. containing at least about 97.5% BeO) has a mesh size passing substantially through 100 mesh. Several typical sieve analyses of this type powder are as follows:

| Mesh Size | Percent | | |
| --- | --- | --- | --- |
|  | No. 1 | No. 2 | No. 3 |
| On 100 | 1 |  |  |
| On 140 | 25 |  |  |
| On 230 | 50 | 5 |  |
| On 325 | 17 | 11 |  |
| Through 325 | 7 | 84 | 100 |

When employing beryllia as a skeleton-supporting material, there are several alternative ways in which it can be used. For example, it can be painted in the form of a liquid slurry onto another ceramic or graphite support and heat treated to produce an adherent coat. When employing a liquid slurry of beryllia in producing a coated support, it is preferred that a fused grade of beryllia of high apparent density be used as this type of beryllia forms a more uniform coating on a supporting refractory-type base. Of course, precautions must be taken against cracking of the coating during use, otherwise the infiltrant metal will react detrimentally with the underlying base material with the result that inferior infiltrated articles will be produced.

Flat beryllia plates can be produced by hot pressing at lower temperatures by the addition of a small amount of lime. Thus, less than 1% of lime will lower the hot pressing temperature to as low as 1500° C. Up to 10% by weight of lime (CaO) may be mixed with chemically pure beryllia for this purpose and still give satisfactory results when the support is employed in the infiltration of titanium carbide skeletons containing less than about 1% free carbon. Other additives which may be used for lowering the hot pressing temperature are alkali metal oxides and fluorides, or silica, or magnesium silicate.

As has been pointed out hereinbefore, beryllia is particularly superior in its behavior as a skeleton-supporting material for titanium carbide skeletons produced from titanium carbide powder containing free carbon in amounts up to about 1%. When the free carbon content of the titanium carbide powder substantially exceeds 1%, inferior and erratic properties of the finally infiltrated article are indicated while below about 1% free carbon, the properties are markedly improved and more consistent, particularly below 0.5% free carbon. This is brought out clearly by the three bands of curves of Fig. 11 which illustrate the effect of the support material on the modulus of rupture properties at room temperature when titanium carbide skeletons produced from titanium carbide powder containing free carbon in amounts ranging from about 0.1% to about 3% are infiltrated with a heat resistant nickel-base alloy while supported by substantially chemically pure beryllia, by substantially chemically pure alumina and by graphite, respectively. All skeletons were infiltrated at a temperature in the neighborhood of about 1400° C. and comprised about 60% to 65% by volume of titanium carbide in the final product.

It will be noted from the bands of Fig. 11 that infiltrated titanium carbide bodies of satisfactory properties are obtained with beryllia as a support when the free carbon content of titanium carbide is below about 1%, particularly below 0.5%, while above about 1% the properties fall off in magnitude and exhibit a wide range of variation. When alumina is employed as a support, inferior properties, insofar as uniformity is concerned, are obtained at free carbon contents below about 1%, especially below 0.5%, while above 1% and up to 3%, or higher, markedly improved properties are obtained. This improvement at higher free carbon levels of titanium carbide with alumina as a support is covered in the copending U. S. patent application Serial No. 292,498. It will be noted from the band for beryllia in Fig. 11 that when the titanium carbide powder in producing the skeleton contains about 0.2% free carbon, the beryllia-supported infiltrated titanium carbide skeleton indicates room temperature modulus of rupture strength properties ranging from over 180,000 p. s. i. to approximately 220,000 p. s. i. On the other hand, when alumina is employed as a support for the same low free-carbon containing titanium carbide, a markedly lower modulus of rupture is indicated varying over a wider range from a maximum of about 180,000 p. s. i. down to as low as about 100,000 p. s. i. Even at 0.4% and 0.5% free carbon levels, superior properties are indicated when beryllia is employed as a support material. It will be noted from Fig. 11 that in the region where the beryllia and alumina bands cross below and above the area near 1% free carbon, that is from about 0.6% or 0.7% to about 1.2% free carbon, comparable and satisfactory properties are indicated when either beryllia or alumina are employed as skeleton-supporting materials. Graphite, on the other hand, indicated inferior results over a wide range of free carbon content up to 3% free carbon, the maximum modulus of rupture hardly reaching 130,000 p. s. i. with minimum values falling to below 80,000 p. s. i. and even to below 40,000 p. s. i. Generally speaking, a minimum room temperature modulus of rupture of at least about 140,000 p. s. i. as obtainable when beryllia is employed as a support for free carbon contents ranging from about 0.1% to about 1%, is desirable.

Analogous effects were also observed when titanium carbide skeletons were infiltrated with cobalt-base heat resistant alloys.

Similar trends were also indicated for modulus of rupture properties determined at 1000° C. A skeleton body produced from titanium carbide powder containing about 0.2% free carbon and infiltrated while in contact with alumina exhibited a low modulus of rupture at 1000° C. of about 76,000 p. s. i. On the other hand, a similar skeleton body produced from 0.2% free carbon titanium carbide and infiltrated while in contact with beryllia exhibited a much higher modulus of rupture at 1000° C. of about 110,000 p. s. i. However, when beryllia was employed as a support for a titanium carbide material containing a high free carbon content of 2.4%, a low modulus of rupture at 1000° C. of 89,000 p. s. i. was obtained. When alumina was employed as a support for a titanium carbide material containing 2.53% free carbon, a much higher modulus of rupture of 141,000 p. s. i. was obtained at 1000° C. Thus, for titanium carbide of low free carbon content (i. e. below about 1% free carbon and especially below 0.5%), beryllia is superior to alumina as a support material, while at high free carbon contents (i. e. above 1% free carbon) alumina is superior to beryllia.

A grade of titanium carbide containing about 78.3% titanium, about 19.1% total carbon and about 0.2% free carbon gave satisfactory results as a skeleton when infiltrated with a nickel-base alloy (comprising 13.59% chromium, 8.28% titanium, 5.72% iron, 1.56% aluminum, 0.076% silica, 0.85% carbon and the balance essentially nickel) while supported by a plate of hot pressed beryllia. The modulus of rupture of a test piece at 1000° C. was approximately 110,000 p. s. i., the test piece exhibiting a high bending angle of 31 degrees at fracture. The room temperature modulus of rupture was as high as 235,000 p. s. i.

Similar bodies infiltrated with an alloy containing 93.5% nickel, 4.3% aluminium, 0.5% silicon, 0.3% manganese, 0.3% carbon and the balance incidental elements, utilizing beryllia as a support, have shown that sound products can be obtained with a modulus of rupture at 1000° C. of 116,000 p. s. i. exhibiting a bending angle of 12 degrees at fracture. The modulus of rupture at room temperature was about 180,000 p. s. i.

Likewise titanium carbide bodies produced from titanium carbide powder containing free carbon of the order of about 0.2% when infiltrated by an alloy containing about 92.5% nickel and 7.5% aluminum have yielded markedly improved modulus of rupture properties of the order of 115,000 p. s. i. at 1000° C. with a 46 degrees bending angle at fracture. The room temperature modulus of rupture was as high as 223,000 p. s. i. Similar results were indicated with nickel-base alloys containing up to 15% aluminum.

For the purpose of giving those skilled in the art a better understanding of the invention, the following additional illustrative examples are given:

Example I

In producing a turbine blade, a batch of titanium carbide powder passing through a 325 mesh screen and containing approximately 79.1% titanium, about 19.2% combined carbon and about 0.3% free carbon was mixed with about 5% by weight of carbonyl nickel powder passing through 325 mesh. The mixture was dry milled in a stainless steel ball mill for about twenty-four hours. The ball milled titanium carbide-nickel powder mixture was blended dry with about 1% by weight of a thermosetting phenolformaldehyde type resin, was then moistened with acetone and wet mixed thoroughly, and the powder mass finally dried, pulverized and passed through a 100 mesh screen. Approximately 320 grams of the powder were pressed into a rectangular block having a density of about 60% of full density. The block was then sintered for one hour at 1400° C. under vacuum. The vacuum increased during sintering from 200 microns down to about 15 microns of mercury column of furnace atmosphere comprising carbon monoxide. The sintered block was cooled under vacuum, removed and then accurately machined to the contours of the finished blade shape. The total weight of the skeleton body was approximately 320 grams.

The infiltration support was pressed from a powder grade of beryllia of the calcined type, all passing through 325 mesh and comprising about 99.8% beryllia (BeO). The hot pressing of this shape was conducted in an induction heated graphite mold at a temperature of 1550° C. and at a pressure of about 2 t. s. i. for a period of about ten minutes to a pressed density of about 1.2 grams per cubic centimeter. Two mating beryllia pieces were pressed, one-half of which contained the negative of the convex shape of the vane and the other half of which fitted the concave side. These two pieces were heated in air to remove residual surface carbon. The blade skeleton was then placed carefully between the two mating halves, thus providing a tight seal along the edges, and the entire assembly placed in the horizontal position into a graphite carrier. The blade was placed with the concave side up. Tungsten weights were used on the upper beryllia piece so as to prevent any movement. About 100 grams of the infiltrant metal was placed at one end of the blade skeleton and on the lower beryllia support piece. The infiltrant alloy had an analysis of 0.85% carbon, 0.76% silicon, 1.56% aluminum, 8.28% titanium, 5.72% iron, 13.59% chromium, and balance essentially nickel. The skeleton body with the infiltrant metal on one end was heated in a carbon tube vacuum furnace and brought up to 1300° C. and held there for about one hour. The infiltrant metal melted and penetrated the pores of the skeleton longitudinally, the infiltrant metal being confined to within the skeleton by the tightly fitting hot-pressed beryllia support. During the infiltration period the vacuum increased, corresponding to a drop in pressure from about 100 microns to about 10 microns of mercury column. The infiltrated body was cooled in vacuum until the infiltrant phase solidified and the cooling then continued down to room temperature in a reducing or neutral atmosphere at substantially atmospheric pressure.

The infiltrated blade separated from the supporting bed of beryllia very easily, exhibited a smooth and clean surface and showed good shape retention and relatively sharp corners and edges. The blade had an average density of about 6.4 grams per cubic centimeter and weighed about 140 grams after removal of the excess infiltrant metal from the end at which it entered the body.

A similar blade produced from the same titanium carbide powder of 0.3% free carbon content but infiltrated while supported by a bed of alumina showded inferior results. The surface of the blade was rough, had surface adhesions, had scattered porosity and also showed signs of erosion. The properties obtained on test sections were of a markedly lower order of magnitude than the properties obtained on similar test sections of the blade skeleton infiltrated while supported by beryllia. Moreover, the alumina-supported blade did not infiltrate as rapidly as the beryllia-supported skeleton. The alumina-supported blade skeleton took 6 hours while the beryllia-supported blade skteleton took only one hour to infiltrate adequately.

Example II

In producing a ring-shaped wear resisting part, a titanium carbide powder all passing through 325 mesh and containing approximately 79.1% titanium, about 19.3% combined carbon and about 0.2% free carbon was mixed with about 5% by weight of cobalt powder. The mixture was dry milled in a stainless steel ball mill for twenty-four hours. The ball milled titanium carbide-cobalt powder mixture was blended dry with about 1% by weight of a thermo-setting phenolformaldehyde type resin. It was then moistened with acetone and wet mixed thoroughly and the powder mass finely dried, pulverized and passed through a 100 mesh screen. About 200 grams of the powder mixture was compacted cold in a carbide-lined steel die at a pressure of 4 t. s. i. into a cylindrical slug about 1" high and 2¼" in diameter and to a density of approximately 61% of full density, i. e. to a pore volume of about 39% of the total outside volume of the slug.

The pressed cylindrical compact was sintered at 1400° C. for about one hour in a vacuum of 20 microns of mercury column at the end of the sintering cycle. The sintered compact was partially machined to form a blind hole or cavity conforming roughly to the cavity of the finished ring, this cavity serving as a reservoir for the infiltrant metal. The closed bottom of the cavity was maintained in order to retain the infiltrant metal. The final weight of the skeleton after machining was about 165 grams.

About 240 grams of a cobalt-base alloy (Stellite-36) was placed in the cavity of the ring blank and the skeleton mounted onto a flat supporting disc of compacted beryllia produced from a grade of powder all passing through a 100 mesh screen and containing about 99.5% BeO. The assembly was heated in a carbon tube vacuum furnace at a temperature of about 1450° C. for about one hour, during which time the infiltrant melted and infiltrated the ring-shaped skeleton body. The furnace atmosphere which comprised carbon monoxide resulting from the reaction of residual atmospheric oxygen with the carbon tube of the furnace, was evacuated during the heating and the infiltration treatments. The vacuum improved from a sub-atmospheric pressure of about 200 microns down to a sub-atmospheric pressure of about 25 microns of mercury column. The infiltrated ring was cooled under vacuum until the liquid infiltrant in the pores of the skeleton solidified. Cooling was then continued to room temperature under a neutral or reducing atmosphere at atmospheric pressure.

The resulting blank which contained about 61% by volume of titanium carbide had a weight of 404 grams and a density of about 6.6 grams per cubic centimeter. The infiltrated ring blank separated cleanly from the beryllia support and could be machined and lapped to its final ring dimensions and shrink-fitted into an alloy steel casing.

A ring similarly prepared from the same type of titanium carbide powder but infiltrated on a flat alumina support did not exhibit good surface quality and furthermore adhered to and tended to spread out on the support. Moreover, the alumina-supported skeleton did not infiltrate as rapidly as the beryllia-supported skeleton. The alumina-supported skeleton took five hours to infiltrate adequately, as compared to the beryllia-supported skeleton which infiltrated in only one hour to produce a markedly improved wear resisting ring.

One of the outstanding advantages to accrue from the use of beryllia or beryllia-base refractory materials as supports in the production of titanium carbide articles by infiltration is the relative ease with which the infiltration is promoted without substantially or detrimentally reacting with the infiltrant metal. Beryllia supports are also advantageously useful in powder metallurgy operations involving liquid phase sintering. For example, beryllia-base supporting materials are useful in the production of cemented carbide tools or other articles wherein the sintering is conducted in the presence of a liquid phase binder metal at relatively high temperature, e. g. 1100° C. to 1500° C. or higher, while the beryllia-base support is in contact with the article being sintered.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In a method for producing a hard, heat and wear resistant, high strength titanium-base carbide body from a heat resistant matrix-forming metal and titanium carbide powder containing about 0.1% to 1% free carbon, the improvement comprising forming a body containing substantially said free-carbon-containing titanium-base carbide and heating said titanium carbide in the presence of a liquid phase of said heat resistant matrix-forming metal at an elevated temperature above the liquidus temperature of said heat resistant metal while said body is supported by and in contact with a beryllia-base support containing at least about 85% beryllium oxide.

2. In a method for producing a hard, heat and wear resistant, high strength titanium-base carbide body from a heat resistant matrix-forming infiltrant metal and titanium carbide powder containing about 0.1% to 1% free carbon, the improvement comprising forming a porous skeleton body of said free-carbon-containing titanium-base carbide powder and infiltrating said skeleton body with a molten heat resistant infiltrant metal at a temperature above the liquidus temperature of said infiltrant metal while said body is supported by and in contact with a beryllia-base support containing at least about 85% beryllium oxide.

3. In a method for producing a hard, heat and wear resistant, high strength titanium-base carbide body by the infiltration of a porous, skeleton body containing substantial amounts of titanium carbide, the steps comprising producing the porous, skeleton body from titanium-base carbide powder containing about 0.1% to 1% free carbon, supporting said skeleton body with a beryllia-base support containing at least about 85% beryllium oxide, contacting a portion of said supported skeleton with at least one matrix-forming infiltrant metal selected from the group consisting of nickel and cobalt, their alloys with each other, and heat resistant alloys based on at least one metal of said group, subjecting said supported skeleton to infiltration at a temperature above the liquidus temperature of said infiltrant metal in a controlled non-oxidizing atmosphere of sub-atmospheric pressure, whereby the beryllia-supported porous skeleton body is substantially completely infiltrated and an infiltrated titanium-base carbide body of consistently high strength properties is obtained.

4. In a method for producing a hard, heat and wear resistant, high strength titanium carbide body by the infiltration of a porous skeleton body containing substantial amounts of titanium carbide, the steps comprising forming said porous skeleton body from titanium carbide powder containing about 0.1% to about 1% of free carbon, supporting said skeleton body by a beryllia-base support containing at least about 85% beryllium oxide, contacting a portion of said supported skeleton with at least one metal from the group consisting of nickel and cobalt, their alloys with each other, and heat resistant alloys based on at least one metal of said group, subjecting the thus-supported skeleton to infiltration at a temperature above the liquidus temperature of said infiltrant metal in a controlled non-oxidizing atmosphere of sub-atmospheric pressure below about 500 microns of mercury column, whereby the beryllia-supported skeleton body is substantially completely infiltrated and an infiltrated titanium carbide body of consistently high strength properties is obtained.

5. In a method for producing a hard, heat and wear resistant, high strength titanium carbide body by the infiltration of a porous skeleton body containing substantial amounts of titanium carbide, the steps comprising forming said porous skeleton body from titanium carbide power containing about 0.1% to 1% free carbon, supporting said skeleton body with a beryllia-base support containing at least about 85% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure below about 500 microns of mercury column, whereby the beryllia-supported skeleton body is substantially completely infiltrated and an infiltrated titanium carbide body of consistently high strength properties is obtained.

6. In a method for producing a hard, heat and wear resistant, high strength titanium carbide body by the infiltration of a porous skeleton body containing substantial amounts of titanium carbide, the steps comprising forming said porous skeleton body from a titanium-base carbide comprising up to 20% tungsten carbide, up to 10% chromium carbide, up to 10% tantalum carbide, up to 19% columbium carbide, substantially the balance being titanium carbide powder containing about 0.1% to 1% free carbon, supporting said skeleton body with a beryllia-base support containing at least about 85% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure below about 500 microns of mercury column, whereby the beryllia-supported skeleton body is substantially completely infiltrated and an infiltrated titanium carbide body of consistently high strength properties is obtained.

7. In a method for producing a hard, heat and wear resistant, high strength titanium carbide body by the infiltration of a porous skeleton body containing substantial amounts of titanium carbide, the steps including forming from titanium carbide powder containing about 0.1% to 1% free carbon a porous skeleton body comprising about 40% to about 80% by volume of the body, supporting said skeleton with a support consisting essentially of chemically pure beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure ranging from about 500 microns down to about 5 microns of mercury column, where the beryllia-supported skeleton body is substantially completely infiltrated and an infiltrated titanium carbide body of consistently high strength properties is obtained.

8. In a method for producing a hard, heat and wear resistant, high strength titanium carbide body by the infiltration of a porous skeleton body containing substantial amounts of titanium carbide, the steps including forming from titanium carbide powder containing about 0.1% to 1% free carbon a porous skeleton body comprising about 40% to about 80% by volume of the body, supporting said skeleton with a beryllia-base support containing at least about 97.5% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure ranging from about 500 microns down to about 5 microns of mercury column, whereby the beryllia-supported skeleton body is substantially completely infiltrated and an infiltrated titanium carbide body of consistently high strength properties is obtained.

9. In a method for producing a hard, heat and wear resistant, high strength titanium carbide body by the infiltration of a porous skeleton body containing substantial amounts of titanium carbide, the steps including forming from titanium carbide powder containing about 0.1% to about 0.5% free carbon a porous skeleton body comprising about 40% to about 80% by volume of the body, supporting said skeleton with a berylia-base support containing at least about 97.5% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure ranging from about 500 microns down to about 5 microns of mercury column, whereby the beryllia-supported skeleton body is substantially completely infiltrated and an infiltrated titanium carbide body of consistently high strength properties is obtained.

10. In a method for producing a hard, heat and wear resistant, high strength titanium carbide body by the infiltration of a porous skeleton body containing substantial amounts of titanium carbide, the steps including forming from titanium carbide powder containing about 0.1% to about 0.5% free carbon a porous skeleton body comprising about 45% to about 75% by volume of the body, supporting said skeleton with a beryllia-base support containing at least about 99.5% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure ranging from about 500 microns down to about 5 microns of mercury column, whereby the beryllia-supported skeleton body is substantially completely infiltrated and an infiltrated titanium carbide body of consistently high strength properties is obtained.

11. In a method for producing a hard, heat and wear resistant, high strength titanium carbide body by the infiltration of a porous skeleton body containing substantial amounts of titanium carbide, the steps including forming from titanium carbide powder containing about 0.1% to 0.5% free carbon a porous skeleton body comprising about 60% to about 65% by volume of the body, supporting said skeleton with a beryllia-base support containing at least about 99.5% beryllium oxide, contacting a portion of said supported skeleton with at least one metal selected from the group consisting of nickel and cobalt, their alloys with each other, and heat resistant alloys based on at least one metal of said group, subjecting the thus-supported skeleton body to infiltration at a temperature up to about 250° C. above the liquidus temperature of said infiltrant metal in a controlled non-oxidizing atmosphere of sub-atmospheric pressure ranging from about 500 microns down to about 5 microns of mercury column, whereby the beryllia-supported skeleton body is substantially completely infiltrated and an infiltrated titanium carbide body of consistently high strength properties is obtained.

References Cited in the file of this patent

UNITED STATES PATENTS

| | | |
|---|---|---|
| 2,352,316 | Goetzel | June 27, 1944 |
| 2,612,443 | Goetzel et al. | Sept. 30, 1952 |